US011105648B2

(12) United States Patent
Chipouras et al.

(10) Patent No.: US 11,105,648 B2
(45) Date of Patent: Aug. 31, 2021

(54) GEOSPATIAL NAVIGATION METHODS AND SYSTEMS FOR AUTOMATICALLY SUSPENDING NAVIGATIONAL GUIDANCE PROVIDED TO A USER OF A MOBILE NAVIGATION DEVICE

(71) Applicant: Verizon Patent and Licensing Inc., Arlington, VA (US)

(72) Inventors: John Chipouras, Denver, CO (US); Daniel Austin Kopyc, Denver, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 246 days.

(21) Appl. No.: 16/218,469

(22) Filed: Dec. 12, 2018

(65) Prior Publication Data
US 2020/0191595 A1    Jun. 18, 2020

(51) Int. Cl.
*G01C 21/36*  (2006.01)
*G08G 1/0968*  (2006.01)

(52) U.S. Cl.
CPC ..... *G01C 21/3641* (2013.01); *G01C 21/3617* (2013.01); *G08G 1/096883* (2013.01)

(58) Field of Classification Search
None
See application file for complete search history.

(56) References Cited

U.S. PATENT DOCUMENTS

| | | | | |
|---|---|---|---|---|
| 7,756,636 B2 * | 7/2010 | Kikuchi | ............ | G01C 21/3629 701/420 |
| 9,803,992 B2 * | 10/2017 | Meredith | ............ | G01C 21/3641 |
| 10,190,887 B2 * | 1/2019 | Nishimura | ............ | G08G 1/123 |
| 2010/0324818 A1 * | 12/2010 | Gellatly | ............ | G01C 21/3641 701/431 |
| 2015/0177013 A1 * | 6/2015 | Siliski | ............ | G01C 21/3423 701/433 |

OTHER PUBLICATIONS

Arikawa et al., "Navitime: Supporting Pedestrian Navigation in the Real World", IEEE Pervasive Computing, vol. 6, Iss. 3, Jul. 2007, pp. 21-29. (Year: 2007).*
Rehrl et al., "Assisting Multimodal Travelers: Design and Prototypical Implementation of a Personal Travel Companion", IEEE Transactions on Intelligent Transportation Systems, vol. 8, No. 1, Mar. 2007, pp. 31-42. (Year: 2007).*

* cited by examiner

*Primary Examiner* — Todd Melton

(57) ABSTRACT

An exemplary geospatial navigation system provides, to a user of a mobile navigation device, navigational guidance along a route from a starting location to a destination location. The geospatial navigation system also identifies a first transportation mode being employed by the user to traverse the route. While the navigational guidance is being provided, the geospatial navigation system receives sensor data generated by a sensor within the mobile navigation device, and determines, based on the sensor data, that the user switches from the first transportation mode to a second transportation mode. In response to the determining that the user switches from the first to the second transportation mode, the geospatial navigation system suspends and/or engages one or more features of the navigational guidance being provided to the user. Corresponding methods and systems are also disclosed.

20 Claims, 10 Drawing Sheets

GEOSPATIAL NAVIGATION METHODS AND SYSTEMS FOR AUTOMATICALLY
SUSPENDING NAVIGATIONAL GUIDANCE
PROVIDED TO A USER OF A MOBILE
NAVIGATION DEVICE

BACKGROUND INFORMATION

Use of mobile navigation devices has proliferated in recent years. For example, along with dedicated navigation devices (e.g., standalone navigation devices, dedicated navigation devices built into vehicles, etc.), general purpose mobile devices such as smartphones and tablet computers may also serve as mobile navigation devices by including hardware and/or software configured to provide geospatial navigation services.

In some examples, a user of a mobile navigation device may request guidance to navigate from one location to another. In response, the mobile navigation device may provide real-time, turn-by-turn instructions to assist the user in navigating a route between the locations. Such instructions may be provided in a variety of ways, including by way of a voice guidance feature, a textual guidance feature, a graphical guidance feature, and/or other suitable features. In certain situations, the user may make one or more stops along the course of navigating the route. For example, a user driving a car may stop for gas or to perform an errand (e.g., to mail a package, to pick up dry cleaning, etc.), a user riding a bicycle may stop to rest for a few minutes or to eat lunch, a user travelling on public transportation may reach a transfer station and switch to a different transportation mode, and so forth.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

Figure 1:
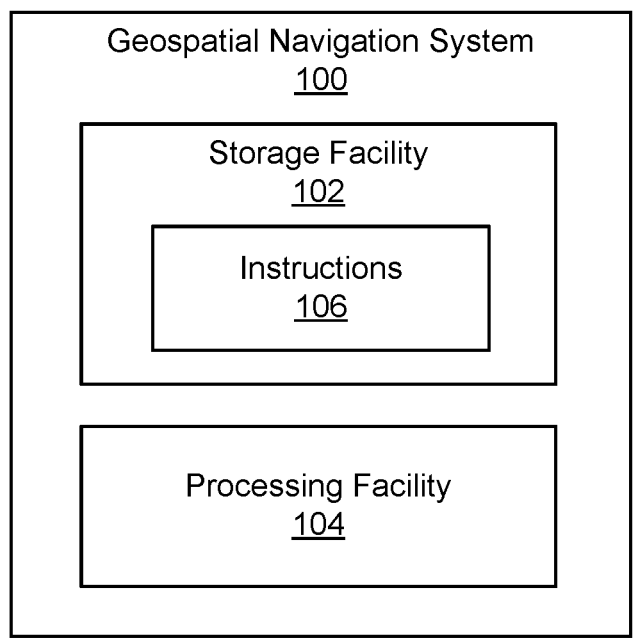
FIG. 1 illustrates an exemplary geospatial navigation system for automatically suspending navigational guidance provided to a user of a mobile navigation device according to principles described herein.

DETAILED DESCRIPTION OF PREFERRED
EMBODIMENTS

Methods and systems for automatically suspending and/or engaging navigational guidance provided to a user of a mobile navigation device are described herein. For example, a geospatial navigation system may provide, to a user of a mobile navigation device, navigational guidance along a route from a starting location to a destination location. The geospatial navigation system may identify a first transportation mode being employed by the user to traverse the route from the starting location to the destination location, and, while the navigational guidance is being provided, may receive sensor data generated by a sensor within the mobile navigation device. Based on the sensor data and while the navigational guidance is still being provided, the geospatial navigation system may determine that the user switches from the first transportation mode to a second transportation mode. In response to the determining that the user switches from the first to the second transportation mode, the geospatial navigation system may suspend a feature of the navigational guidance being provided to the user.

As one specific example of how such a geospatial navigation system may be employed, a user of a mobile navigation device (e.g., a smartphone, etc.) may traverse a route using an automotive transportation mode (e.g., driving or riding as a passenger in a car or truck, etc.). As mentioned above, the user may follow instructions provided by the mobile navigation device to navigate from a starting location to a destination location, but may make stops along the route. In some examples, such stops may be planned and programmed in to the mobile navigation device so that the instructions facilitate the user in arriving at the locations he or she would like to stop. However, in other examples, the user may decide to make stops that are not anticipated or planned ahead of time, and/or that are not programmed into the mobile navigation device. When making such a stop, the user may switch modes of transportation in a way that is detectable by a geospatial navigation system if the mobile navigation device is being carried by the user. For example, if the user pulls over to stop at a gas station, the geospatial navigation system (which may be implemented within the mobile navigation device or in communication with the mobile navigation device) may detect that the user is no longer riding in the vehicle but is now walking (e.g., to fill up the car, to purchase items inside the gas station, etc.). As a result of this detection, the geospatial navigation system may suspend (e.g., temporarily pause) certain navigational guidance features that may be distracting, annoying, unhelpful, and/or otherwise undesirable under the circumstances. For example, the mobile navigation device may suspend voice guidance and haptic guidance as long as the user is walking and not driving. In this way, the mobile navigation device may avoid providing vocal instructions to the user from inside the user's pocket as he or she is inside the gas station and not actually navigating or prepared to make use of the instructions. Geospatial navigation methods and systems described herein may direct the mobile navigation device to perform these functions or other corresponding functions in other contexts involving various modes of transportation, various navigational guidance features, various situations occurring at different points during or after a route has been traversed, and so forth.

Additionally or alternatively, if the geospatial navigation system detects that the user pulls over to stop at a point of interest, one or more features may be engaged or enabled (along with or instead of the suspension of the navigational guidance features described above). In this way, the geospatial navigation system may provide further value to the user and/or the geospatial navigation service by providing any of various functions that will be described in more detail below.

Geospatial navigation methods and systems described herein for automatically suspending navigational guidance may provide various advantages and benefits over conventional geospatial navigation technologies. Conventional geospatial navigation technologies typically provide instructions based on the current geolocation of the mobile navigation device and a route that has been determined. For these technologies, if it is detected that the mobile navigation device has failed to follow the instructions given, updated instructions may automatically be provided to help the user get back on track. This behavior is helpful under many circumstances such as, for instance, if the user misses a prescribed turn or accidentally makes a wrong turn as he or she is navigating the route. In other circumstances, however, this behavior may be unhelpful and undesirable. For example, if a user pulls over to get gas without being prompted to do so, as in the example described above, the user may not find it helpful for the navigation application to repeatedly try to instruct the user about how to get back on the road, especially when such instructions are given vocally while the user carries the mobile navigation device with him or her in the gas station. To the contrary, such instructions provided in such contexts may be irritating and undesirable.

Geospatial navigation methods and systems described herein may help reduce, minimize, and/or prevent such annoyances and inconveniences by intelligently and automatically determining when a user switches from one transportation mode to another (e.g., from driving to walking) and, in response to this determination, suspending at least certain features of navigational guidance being provided to the user. For example, as mentioned above, the systems described herein may automatically suspend certain features of the navigational guidance such as voice guidance, vibrational or other haptic alerts, textual notifications, and so forth, while potentially keeping other features operational. In this way, geospatial navigation methods and systems described herein may help provide a more pleasant navigational experience for the user because the user can carry his or her mobile navigation device without having to remember and go to the effort of manually suspending the navigational guidance or having the mobile navigation device provide unwanted navigational guidance at inappropriate times. At the same time, systems and methods described herein may automatically suspend and/or resume navigational guidance without compromising the ultimate objective of facilitating the user in effectively navigating to a destination.

Other benefits may also be provided by methods and systems described herein. For example, by suspending various navigational guidance features when they are not needed or wanted, certain resources of the mobile navigation device (e.g., battery resources, mobile data resources, etc.) may be conserved. Additionally, as will be described in more detail below, undesirable navigation instructions may be replaced, in certain examples, by information and/or features that provide value to the user in the context of the situation and/or location of the user. For example, the geospatial navigation system may provide helpful information, coupons, or incentives specifically related to the point of interest at which the user has stopped (e.g., the gas station in the above example).

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary geospatial navigation system 100 ("system 100"). As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation.

Storage facility 102 may maintain (e.g., store) executable data used by processing facility 104 to perform any of the functionality described herein. For example, storage facility 102 may store instructions 106 that may be executed by processing facility 104 to perform any of the functionality described herein. Instructions 106 may be implemented by any suitable application, software, code, and/or other executable data instance. Storage facility 102 may also maintain any data received, generated, managed, used, and/or or transmitted by processing facility 104.

Processing facility 104 may be configured to perform (e.g., execute instructions 106 stored in storage facility 102 to perform) various processing functions associated with automatically suspending navigational guidance provided to a user of a mobile navigation device. For example, processing facility 104 may provide navigational guidance along a route from a starting location to a destination location to a user of a mobile navigation device that may fully or partially implement system 100, that may fully or partially be implemented by system 100, or that may be communicatively coupled to system 100 (if implemented separately from system 100).

Processing facility 104 may further identify a first transportation mode being employed by the user to traverse the route from the starting location to the destination location. While processing facility 104 is providing the navigational guidance, processing facility 104 may receive sensor data generated by a sensor within the mobile navigation device. For example, the sensor data may include motion data from a sensor such as a gyroscope or an accelerometer, geolocation data from a geolocation sensor such as a Global Positioning System ("GPS") sensor, or other suitable sensor data. Based on this sensor data, and while the navigational guidance continues to be provided to the user, processing facility 104 may determine that the user switches from the first transportation mode to a second transportation mode. For instance, referring to the specific example above, the geospatial navigation system may determine that the user switches from an automotive transportation mode to a non-vehicular transportation mode such as walking (e.g., as the user walks around the car to fill the car with gas or walks into the gas station).

As a result, and in response to the determining that the user switches from the first to the second transportation mode, processing facility 104 may suspend one or more features of the navigational guidance being provided to the user in any of the ways described herein. For example, as mentioned above, the geospatial navigation system may suspend voice guidance of the mobile navigation device to prevent the mobile navigation device from providing audible verbal instructions to the user when such instructions are not helpful or desirable.

In some implementations, system 100 (e.g., processing facility 104) may be configured to automatically suspend navigational guidance provided to a user of a mobile navigation device in real time. As used herein, a function may be said to be performed in real time when the function relates to or is based on dynamic, time-sensitive information (e.g., sensor data detected by sensors of the mobile navigation device, a current geolocation of the mobile navigation device, etc.) and the function is performed while the time-sensitive information remains accurate or otherwise relevant. Due to processing times, communication latency, and other inherent delays in physical systems, certain functions may be considered to be performed in real time when performed immediately and without undue delay, even if performed after small delay (e.g., a delay up to a few seconds or the like).

Figure 2:
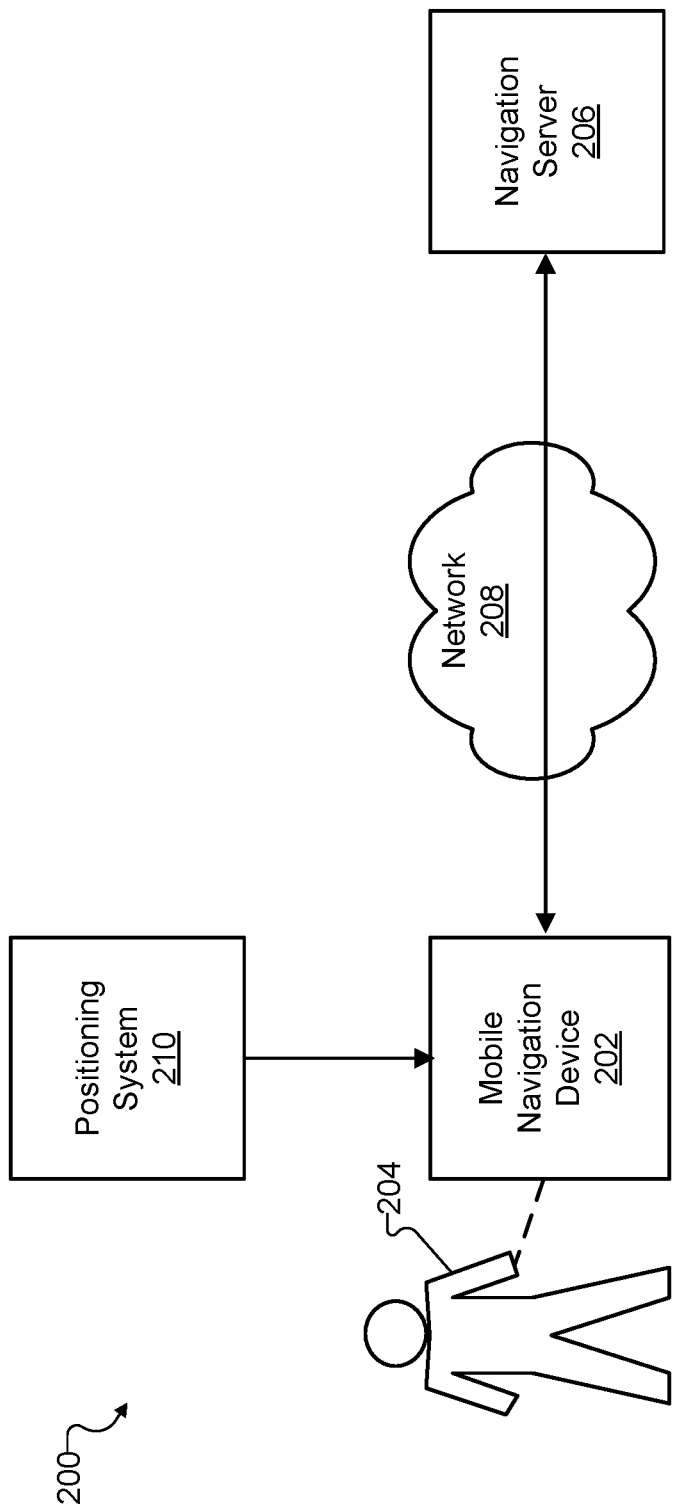
FIG. 2 illustrates an exemplary configuration in which the geospatial navigation system of FIG. 1 may operate to automatically suspend navigational guidance provided to a user of a mobile navigation device according to principles described herein.

FIG. 2 illustrates an exemplary configuration 200 in which system 100 may operate to automatically suspend navigational guidance provided to a user of a mobile navigation device. As shown in configuration 200, a mobile navigation device 202 being used by a user 204 is communicatively coupled with a navigation server 206 by way of a network 208. Mobile navigation device 202 also is communicatively coupled to a positioning system 210 that is shown to provide information to mobile navigation device 202 directly.

Mobile navigation device 202 may be implemented as any type of mobile device that includes hardware and/or software configured to perform navigation services described herein such as executing a geospatial navigation application, performing real-time tracking of a geolocation of mobile navigation device 202, providing user 204 navigational guidance (e.g., including suspending and/or resuming such navigational guidance), communicating with navigation server 206 and/or positioning system 210, and so forth. For example, mobile navigation device 202 may be implemented by a mobile phone (e.g., a smartphone), a tablet device, a dedicated navigational device (e.g., a portable navigation device that may be temporarily integrated with a vehicle such as by being mounted on a dashboard of the vehicle, etc.), a laptop computer, or the like.

Navigation server 206 may be implemented by one or more servers or other computing systems operated by a navigation service provider, a cellular network service provider, or the like. Navigation server 206 may store data representative of geography (e.g., maps, etc.), points of interest, user preferences, usage histories (e.g., search histories, tracked movements of mobile navigation device 202, etc.), and/or any other data as may be useful for implementing navigational services and/or any of the operations described herein. In particular, navigation server 206 may be used to store large amounts of data associated not only with a single mobile navigation device or location, but with multiple mobile navigation devices (e.g., thousands of mobile navigation devices used by thousands of subscribers, etc.), multiple locations (e.g., nationwide or global locations, etc.), and so forth.

Network 208 may facilitate data delivery between server-side systems such as navigation server 206 and client-side systems such as mobile navigation device 202 in a server-client data delivery architecture illustrated by configuration 200. As such, network 208 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks. Data may be distributed using any suitable communication technologies included within network 208. As such, data may flow between navigation server 206 and mobile navigation device 202 using any communication technologies, devices, media, and protocols as may serve a particular implementation.

Positioning system 210 may be implemented as one or more satellites or other suitable data sources that provide, directly to mobile navigation device 202, information from which mobile navigation device 202 may derive a geolocation (e.g., its own current geolocation). For example, positioning system 210 may represent the GPS operated by the United States or a similar satellite-based or non-satellite-based positioning system operated by another country. In some examples, positioning system 210 may further include terrestrial-based enhancement or correction data to make raw satellite-based positioning more accurate. For instance, positioning system 210 may generate and provide real-time kinematic ("RTK") signaling to enhance the precision of satellite-based signaling received by the GPS or other such systems. Data received from positioning system 210, when analyzed and processed by mobile navigation device 202 and/or other mobile navigation devices, may facilitate the real-time derivation of geolocation information such as the current geolocation of the mobile navigation devices.

System 100 may operate within and be implemented by configuration 200 in any suitable way. For instance, system 100 may be fully implemented by mobile navigation device 202, fully implemented by navigation server 206, distributed between (i.e., partially implemented by each of) mobile navigation device 202 and navigation server 206, distributed across other elements illustrated in configuration 200 or other suitable elements not explicitly shown, or otherwise implemented in any manner as may serve a particular implementation.

As one example, system 100 may be implemented, in full or in part, by navigation server 206, which may store some or all of the data of storage facility 102 (e.g., including data specific to user 204 as well as data for additional users associated with additional mobile navigation devices not explicitly shown). In such examples, navigation server 206 may store geospatial navigation application software that navigation server 206 may provide to mobile navigation device 202 for download and installation by mobile navigation device 202. By providing such software, navigation server 206 may be said to direct mobile navigation device 202 to perform the operations included within the software instructions.

As another example, system 100 may be fully or partially implemented by mobile navigation device 202. In certain implementations, for instance, mobile navigation device 202 may directly perform operations described herein for system 100 (e.g., receiving the sensor data, determining that the user switches from the first to the second transportation mode, suspending a feature of the navigational guidance in response to the transportation mode switch, etc.), but, in doing so, may employ at least some information stored within databases managed by navigation server 206 and/or provided by positioning system 210.

User 204 may carry and use mobile navigation device 202 for any suitable purpose (e.g., work, recreation, navigation, etc.). In certain examples, mobile navigation device 202 is implemented as a personal mobile device (e.g., a smartphone, etc.) that the user generally carries with them (e.g., keeps nearby) throughout the day and night. As used herein, a user may be said to "carry" a mobile navigation device when actively using the mobile navigation device, passively keeping the mobile navigation device on his or her person (e.g., in a pocket, purse, briefcase, etc.), or otherwise keeping the mobile navigation device nearby (e.g., setting the device on a desk in the user's work area during work hours, charging the device within the home while the user is asleep, temporarily mounting the device on a dashboard while the user is driving, etc.). As a result of the mobile navigation device being carried by a user in any of the ways described above, system 100 may determine, in any of various ways that will be described in more detail below, that the user switches from one transportation mode to another based on sensor data generated by sensors of the mobile navigation device.

Figures 3A, 3B:
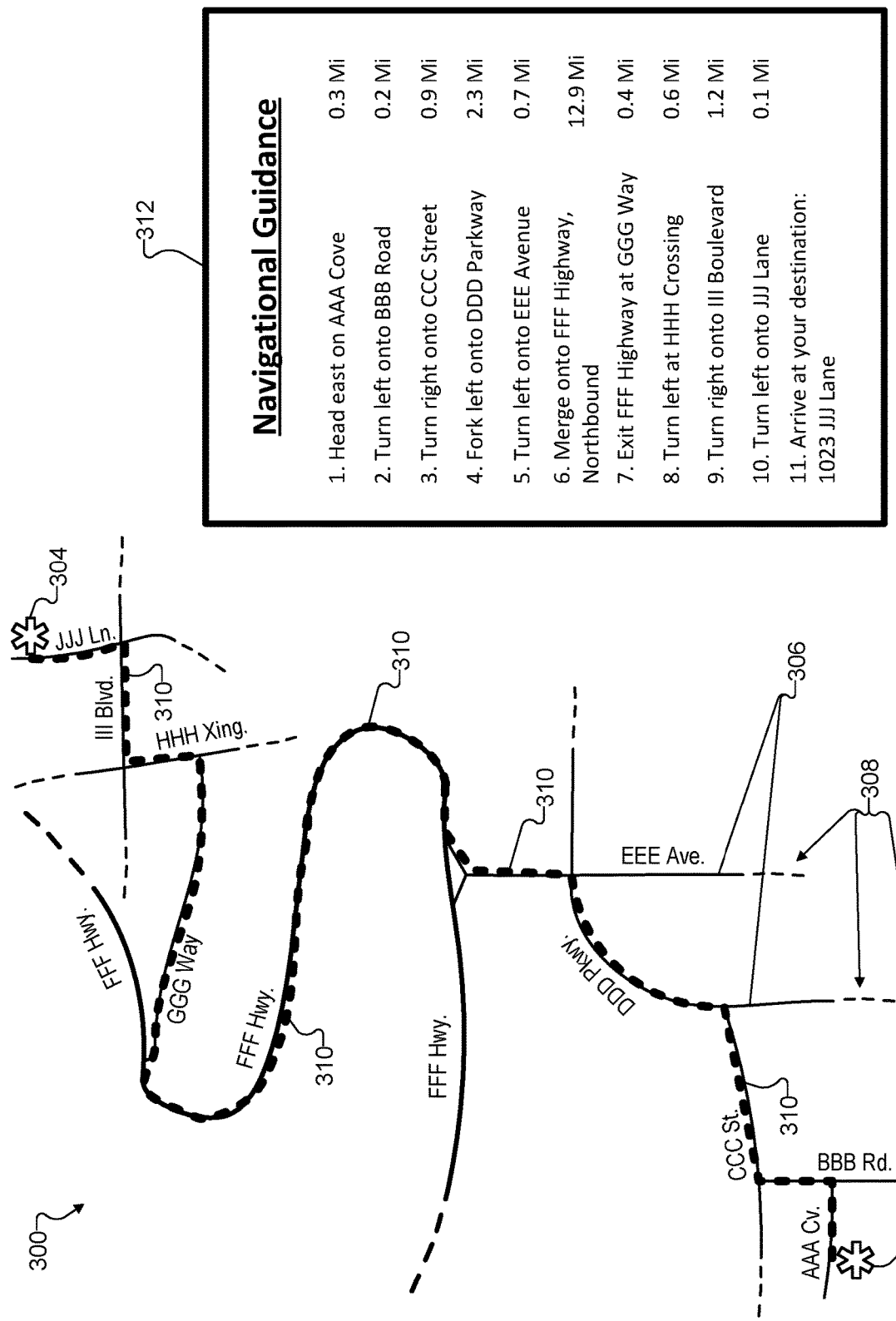
FIG. 3A illustrates an exemplary route between a first location and a second location along a set of different paths according to principles described herein.
FIG. 3B illustrates exemplary navigational guidance associated with the route of FIG. 3A according to principles described herein.

To illustrate how mobile navigation device 202 may provide navigational guidance to user 204, FIG. 3A shows an exemplary route from a starting location to a destination location along a set of different paths. Specifically, FIG. 3A depicts a map 300 that includes a starting location 302 and a destination location 304 that are connected by various segments of a series of different paths 306.

Locations 302 and 304 may represent any suitable locations, including locations of particular points of interest. For example, points of interest at locations 302 and/or 304 may include homes or residences, offices or other workplaces, restaurants or other such establishments, retail stores or other places of business, public properties such as libraries or parks, neighborhoods, churches, or any other entities associated with particular geographical locations and that may be of interest to users. In some examples, locations 302 and/or 304 may be singular locations such as may be defined by a street address or a set of coordinates (e.g., longitudinal and latitudinal coordinates). In the same or other examples, locations 302 and/or 304 may refer to geographical areas such as neighborhoods or other regions, municipalities (e.g., cities, towns, etc.), territories (e.g., counties, states, countries, etc.), or the like.

As used herein, a "path" may refer to any type of road, street, thoroughfare, highway, etc., upon which motorized vehicles may drive, or may be another type of path such as a foot path, a bicycle route, a walking trail, a public transport line (e.g., a train line, a bus line, etc.), or any other course or way upon which user 204 may travel (e.g., whether using some type of vehicle or not). For example, map 300 depicts paths including "AAA Cv.," "BBB Rd.," "CCC St.," "DDD Pkwy.," "EEE Ave.," "FFF Hwy.," "GGG Way," "HHH Xing.," "III Blvd.," and "JJJ Ln.," all of which will be understood to be streets upon which an automotive vehicle such as a car may drive. It will be understood that, as shown in FIG. 3A, paths 306 are not drawn to scale and do not generally depict paths in their entirety. Rather, for clarity of illustration, relevant segments of each path 306 are shown with ellipsis symbols 308 drawn as applicable to indicate that the path continues on in a manner not explicitly shown on the representation of map 300 in FIG. 3A.

A route 310 depicted as a thick dotted line traversing various segments of paths 306 is shown to connect starting location 302 with destination location 304. Route 310 may be generated based on a request received from user 204. For instance, user 204 may provide user input representative of a request for mobile navigation device 202 to provide navigational guidance from starting location 302 to destination location 304 in any suitable way. In one example, for instance, user 204 may explicitly input an address or point of interest to which user 204 wishes to discover a route to from his or her current location. In other examples, user 204 may input two or more such addresses or points of interest and direct mobile navigation device 202 to provide navigational guidance between them. In some examples, rather than directly inputting specific addresses or points of interest, user 204 may request navigational guidance from mobile navigation device 202 in other ways. For instance, user 204 may use a digital assistant or voice-command interface to request the navigational guidance (e.g., asking "How do I get home?" or "How do I get to the nearest gas station?"). As another example, the user may request the navigational guidance by selecting a user preference setting that allows mobile navigation device 202 to automatically attempt to determine and anticipate where user 204 may want to navigate to based on previously observed behavior. For example, if such a setting is selected, mobile navigation device 202 may automatically determine that user 204 has requested navigational guidance to drive home after work at 5:00 PM on a weekday if that is something that the user has habitually requested directly.

Once mobile navigation device 202 has determined and/or defined route 310 from starting location 302 to destination location 304, mobile navigation device 202 may provide navigational guidance to user 204 relating, step-by-step, how user 204 is to navigate from starting location 302 to destination location 304. To illustrate, FIG. 3B shows exemplary navigational guidance 312 associated with route 310. Specifically, as shown, navigational guidance 312 includes a plurality of instructions numbered 1 through 11 that are configured to guide user 204 from starting location 302 to destination location 304. It will be understood that, in other examples, navigational guidance 312 could instead include instructions to guide user 204 from location 304 to location 302 or to guide user 204 between any two or more suitable locations. Additionally, along with such turn-by-turn instructions, navigational guidance 312 may also incorporate other useful information (e.g., real-time, updated information) such as traffic updates (e.g., indicating accidents or other traffic issues on the route), estimated time of arrival ("ETA") updates, rerouting suggestions, and so forth.

As shown, navigational guidance 312 in FIG. 3B includes a set of complete, turn-by-turn, instructions. Specifically, instruction 1 indicates that user 304 is to "head east on AAA Cove" for 0.3 miles. Instruction 2 indicates that user 304 is to "turn left onto BBB Road" and continue on BBB Road for 0.2 miles. Instruction 3 indicates that user 304 is to "turn right onto CCC Street" and continue on CCC Street for 0.9 miles. Instruction 4 indicates that user 304 is to "fork left onto DDD Parkway" and continue on DDD Parkway for 2.3 miles. Instruction 5 indicates that user 304 is to "turn left onto EEE Avenue" and continue on EEE Avenue for 0.7 miles. Instruction 6 indicates that user 304 is to "merge onto FFF Highway, Northbound" and continue on FFF Highway Northbound for 12.9 miles. Instruction 7 indicates that user 304 is to "exit FFF Highway at GGG Way" and continue on GGG Way for 0.4 miles. Instruction 8 indicates that user 304 is to "turn left onto HHH Crossing" and continue on HHH Crossing for 0.6 miles. Instruction 9 indicates that user 304 is to "turn right onto III Boulevard" and continue on III Boulevard for 1.2 miles. Instruction 10 indicates that user 304 is to "turn left onto JJJ Lane" and continue on JJJ Lane for 0.1 miles. Finally, instruction 11 indicates that user 304 will arrive at his or her destination (i.e., at 1023 JJJ Lane).

As described above, it may not be desirable for all navigational guidance features to be provided at all times when a user is navigating from a starting location to a destination location. For example, if user 204, while traversing route 310 from starting location 302 to destination location 304, is detected to switch from one transportation mode (e.g., an automotive transportation mode in which user 204 is driving or riding as a passenger in an automobile) to another transportation mode (e.g., a non-vehicular transportation mode in which user 204 is walking or running), it may be undesirable for certain navigational guidance features (e.g., voice guidance, haptic vibrations, etc.) to persist for the reasons described above. To illustrate, a specific example will now be set forth by FIGS. 4 through 8.

As will be described in relation to FIGS. 4 through 8, in this particular example, user 204 is traversing route 310 by way of an automobile and makes a stop (e.g., a lunch stop or the like) at which user 204 exits the vehicle, walks around for a period of time (e.g., to walk inside and get lunch), and returns back to the vehicle to traverse the remainder of route 310. While this situation may constitute one typical example of how geospatial navigation methods and systems described may be used in certain implementations, it will be understood that, in other situations, examples, and/or implementations, geospatial navigation methods and systems may be different. For instance, transportation modes other than automotive and non-vehicular transportation modes may be employed to trigger the suspension of one or more navigational guidance features, other actions besides suspending navigational guidance features may be performed based on a user switching transportation modes, and so forth. Certain such alternative examples will be mentioned in the description below, but it will be understood that various examples not explicitly described may likewise be implemented within the spirit of the description provided herein.

Figure 4:
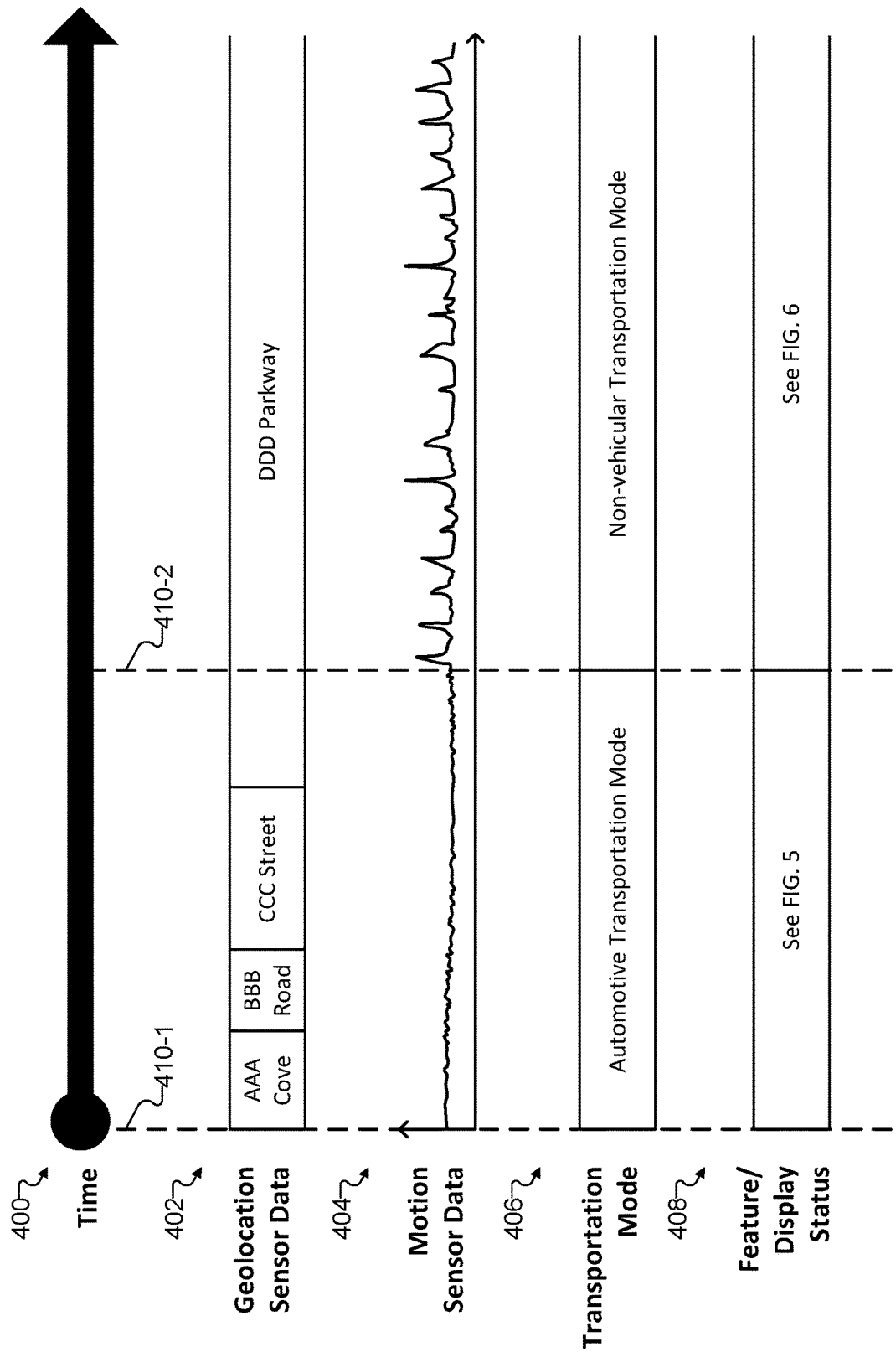
FIG. 4 illustrates an exemplary timeline depicting various aspects of a mobile navigation device status as the mobile navigation device is carried by a user traversing a first part of the route of FIG. 3A according to principles described herein.

FIG. 4 illustrates an exemplary timeline 400 depicting various aspects of the status of mobile navigation device 202 as mobile navigation device 202 is carried by user 204 traversing a first portion of route 310. Specifically, timeline 400 depicts geolocation sensor status 402, motion sensor data 404, transportation mode 406, and a feature/display status 408 as each of these aspects of the overall mobile navigation device status changes in time. FIG. 4 illustrates a first portion of timeline 400 and the corresponding aspects of the overall status of mobile navigation device 202, while FIG. 7 (which will be described in more detail below) illustrates a second portion of timeline 400. Specifically, FIG. 4 depicts the mobile navigation device status as user 204 (carrying mobile navigation device 202) traverses route 310 from starting location 302 at AAA Cove to DDD Parkway, as well as a stop that user 204 makes along DDD parkway (e.g., to pick up lunch, to fill the car with gas, to buy items from a store or perform another errand, to pick up another person, etc.). As will be described in more detail below, FIG. 7 will then depict the mobile navigation device status as user 204 traverses route 310 from the stop along DDD parkway until the end of the route at destination 304 on JJJ Lane. As will be referred to and described in more detail below, various points in time 410 (e.g., "time 410-1" through "time 410-4") are illustrated along timeline 400 as dashed lines extending vertically through each of the aspects of the mobile navigation device status. Each of the aspects of the overall status of mobile navigation device 202 will now be described in more detail.

Geolocation sensor data 402 is representative of respective locations where mobile navigation device 202 is detected to be located during the time period covered by timeline 400. System 100 may determine geolocation sensor data 402 in any suitable way. For instance, system 100 may use geolocation sensors such as GPS sensors, sensors used to implement cell tower triangulation geolocation, etc., to detect and track a dynamic geolocation of mobile navigation device 202. In some examples, sensor data collected or received by system 100 from such sensors may be used to derive a geolocation with only limited accuracy. As such, it may be difficult in certain cases for system 100 to reliably determine if mobile navigation device 202 is in the middle of a particular path (e.g., traveling along a lane of a particular road), is pulled off to the side of the path, or is even, for example, parked in a parking lot near the path. For this reason, system 100 may, in certain implementations, use geolocation data as a secondary data source for increasing or decreasing confidence in conclusions made primarily based on a data such as motion sensor data from motion sensors. Examples of how motion sensor data and geolocation sensor data may be used together in this way will be described in more detail below.

Sensors providing sensor data to system 100 may be implemented as any suitable type of sensor or other implement for detecting information about the physical world. For instance, as described above, geolocation sensors may be configured to detect and track the geolocation of mobile navigation device 202 (referred to herein as geolocation sensor data) as mobile navigation device 202 is carried through the world by user 204. Exemplary geolocation sensors may include satellite-based positioning sensors (e.g., GPS sensors, etc.), terrestrial-based positioning sensors (e.g., wireless radios capable of capturing signals emitted by cellular towers and from which a geolocation may be derived by triangulation techniques), and so forth. Other types of sensors that may be employed by system 100 will be described in more detail below.

As shown in FIG. 4, user 204 begins carrying mobile navigation device 202 along path 310 at time 410-1 at a location determined to be AAA Cove. As shown by geolocation sensor data 402, mobile navigation device 202 traverses route 310 from AAA Cove, to BBB Road, to CCC Street, to DDD Parkway, as per the instructions of navigational guidance 312 in FIG. 3B.

Motion sensor data 404 may be collected and/or received by mobile navigation device 202 as mobile navigation device 202 is carried along path 310. For example, various types of sensors associated with mobile navigation device 202 may each provide sensor data usable by system 100 to detect changes in transportation mode 406 (described in more detail below). Sensors used to collect and detect motion sensor data for system 100 may be associated with mobile navigation device 202 in any suitable manner. For example, some sensors may be built into or otherwise integrated with mobile navigation device 202, while other sensors may be integrated with other devices communicatively coupled with mobile navigation device 202. For instance, as one example, a fitness-tracking watch linked to mobile navigation device 202 may include a pedometer or GPS sensor that may be used by mobile navigation device 202 along with or instead of similar such sensors integrated within mobile navigation device 202 itself. As another example, a Bluetooth-linked On-Board Diagnostic ("OBD") device built into a vehicle being driven by the user may provide information related to what gear the vehicle is in (e.g., park, neutral, drive, etc.), how much fuel is left in the tank, whether the "check engine" light is on, and the like. By leveraging these types of information from these types of sensors, system 100 may more accurately determine the navigation mode of mobile navigation device 202, predict a purpose for a detected stop (e.g., to refuel, to get the vehicle looked at by a mechanic, etc.), and so forth.

Motion sensors may be configured to detect motion sensor data about the movement of mobile navigation device 202 through the world. Exemplary motion sensors may include accelerometers, gyroscopic sensors, compass sensors, pedometer sensors (i.e., step counters), and so forth. Additionally, other types of sensors may similarly be configured to detect and/or track movement, geolocation, and/or other information about mobile navigation device 202. Such sensors may be used to provide primary or supplementary data used to determine the user's transportation mode and/or changes thereto. For example, a camera or other image sensor associated with mobile navigation device 202 may provide data that further helps differentiate between similar transportation modes that produce similar (and therefore difficult to distinguish) motion sensor data and/or geolocation sensor data.

As mentioned above, in certain examples, different sensors (e.g., including sensors of different types) may be used together to determine a transportation mode, a change in transportation mode, or the like. For instance, in one implementation, a first sensor may be implemented as a motion sensor integrated into mobile navigation device 202 and configured to generate motion sensor data 404 representative of movement of mobile navigation device 202 as user 204 carries mobile navigation device 202. Additionally, geolocation sensor data 402 generated by a geolocation sensor may also be tracked and received while mobile navigation device 202 is moving in accordance with navigational guidance being provided. In this example, system 100 may determine that user 204 switches from the first to the second transportation mode based on both motion sensor data 404 (e.g., which may be used as a primary data source in certain examples) and geolocation sensor data 402 (e.g., which may be used as a secondary data source for increasing confidence of conclusions made based on the motion data in certain examples).

Motion sensor data 404 is depicted in FIG. 4 as a signal from a motion sensor such as an accelerometer. As shown, the signal is depicted to be relatively smooth starting at time 410-1 (while mobile navigation device 202 is in the automobile), and to abruptly change at time 410-2 into a periodic, semi-periodic, or other detectable pattern (when user 204 begins walking and carrying mobile navigation device 202). The signal associated with motion sensor data 404 in FIG. 4 is exemplary only, and illustrates how system 100 may determine, based on a change in motion sensor data, that a transportation mode switch may have occurred even when that switch is not detectable based on geolocation sensor data alone. To illustrate, it is noted that geolocation sensor data 402 does not significantly change at time 410-2 (i.e., mobile navigation device 202 continues to remain on or near DDD Parkway), and that motion sensor data 404 represents the primary indication that user 204 has ceased riding in the automobile and is now walking.

Transportation mode 406 illustrates the transportation mode identified and/or detected by system 100 at different times along timeline 400. Specifically, as shown, transportation mode 406 shows that system 100 may identify the first transportation mode being employed by user 204 to traverse route 310 to be an "automotive transportation mode" associated with driving or riding as a passenger in an automobile. Transportation mode 406 further shows that system 100 may identify the second transportation mode as being a "non-vehicular transportation mode" associated with movement independent of vehicular support (e.g., walking, running, etc.). As mentioned above, while automotive and non-vehicular transportation modes are used as an example in FIG. 4, it will be understood that system 100 may further be configured to identify and determine various other types of transportation modes in certain implementations. For instance, system 100 may further identify a non-automotive vehicular transportation mode such as a cycling mode, a motorcycling mode, or the like. As another example, system 100 may be configured to differentiate between walking, jogging, running, and/or other non-vehicular transportation modes where differences between them may be deemed relevant to a particular implementation.

In some examples, system 100 may also be configured to differentiate vehicular transportation modes such as the automotive transportation mode from public transportation modes that typically also involve vehicles (e.g., buses, trains, taxi services, etc.). This may be useful, for example, if user 204 desires to receive comprehensive navigational guidance to facilitate navigating to a public transportation hub (e.g., a subway station, a bus stop, etc.), while desiring to receive diminished navigational guidance (e.g., navigational guidance without voice guidance, etc.) or no navigational guidance while riding the public transportation. For instance, user 204 may desire for voice guidance to be suspended while user 204 is on a bus or train, and to be resumed again when user 204 exits the bus or train.

System 100 may determine transportation mode status 406 in any suitable way. For instance, around time 410-1 (e.g., possibly slightly before or slightly after mobile navigation device 202 begins moving along route 310), system 100 may be configured to identify the first transportation mode being employed by user 204 to traverse route 310 by prompting user 204 to indicate how route 310 will be traversed (e.g., by car, bicycle, walking, public transportation, etc.). In some implementations, for instance, the transportation mode may be selected as part of the request provided by user 204 to navigate from starting location 302 to destination location 304, and, as such, may already be known to system 100 when route 310 is defined. Additionally or alternatively, system 100 may automatically detect (e.g., based on how fast location data is changing, based on a pattern identified in motion sensor data, etc.) the first transportation mode once mobile navigation device 202 is already in motion along route 310 (e.g., while navigational guidance is being provided).

In contrast, the change to the second transportation mode (i.e., the non-vehicular transportation mode in the example of FIG. 4) may be automatically determined or detected based on sensor data alone (e.g., including geolocation sensor data 402, motion sensor data 404, etc.), rather than any explicit user input. For example, as described above, sensor data may indicate how mobile navigation device 202 is moving (e.g., including a speed of mobile navigation device 202, a pattern of movement of mobile navigation device 202, etc.), where mobile navigation device 202 is located (e.g., including if mobile navigation device 202 is located in the middle of a path, is pulled off to the side of the path or slightly off the path, etc.), and so forth.

In some examples, an operating system of mobile navigation device 202 may perform analysis functions to determine the transportation mode of mobile navigation device 202 and to provide data representative of the transportation mode to applications executing on the operating system platform. For instance, if mobile navigation device 202 is implemented as a personal mobile device (e.g., a smartphone device, a tablet device, etc.), a mobile operating system executing thereon may provide an environment within which various mobile applications may execute. The mobile operating system may provide data representative of the transportation mode of mobile navigation device 202 to the mobile applications for use by the mobile applications. As such, the mobile operating system may be included as part of system 100 and may directly determine, for example, that user 204 switches from one transportation mode to another.

In other examples, the mobile operating system may be separate from, but communicatively coupled with, system 100, such that system 100 performs the sensor-data-based determination that user 204 switches from one transportation mode to another by receiving transportation mode data from the mobile operating system (e.g., transportation mode data that the mobile operating system derives based on sensor data). For example, based on sensor data, the mobile operating system may provide various variables (e.g., Boolean variables indicative that user 204 carrying mobile navigation device 202 is detected to be stationary, walking, running, in an automotive vehicle, cycling, using an unknown transportation mode, or the like) for use by mobile applications such as a geospatial navigation application implementing or included within system 100.

Additionally or alternatively, mobile applications themselves or implementations of system 100 that do not relate to mobile operating systems may determine transportation mode data independently of operating system functions. For example, applications may gather sensor data and analyze the data in connection with various algorithms to make the transportation mode determinations described herein.

As mentioned above, in certain examples, sensor data collected from different sources (e.g., from different types of sensors) may be used in different ways, such as to primarily determine a transportation mode or to supplement such a determination by, for example, indicating a confidence level of the determination. By not only determining the most likely type of transportation mode to be in use at a particular moment, but also determining a relative confidence level associated with that transportation mode, system 100 may be more accurate and reliable, and/or may perform in more consistent, predictable, and helpful ways. For example, in certain situations in which it is difficult to determine the true transportation mode of user 204, it may be preferable for system 100 to err on the side of failing to detect a true transportation mode switch rather than falsely detecting a transportation mode switch when none has occurred. In these situations, it may be more acceptable for user 204 to continue using all the navigational guidance features even when the transportation mode has changed (e.g., when user 204 has pulled over and is walking) than to stop receiving the benefit of all the navigational guidance features when the features are being relied upon (e.g., when user 204 is still driving).

To this end, system 100 may be configured to determine that user 204 switches from the first to the second transportation mode by 1) determining (e.g., based on one type of sensor data such as motion sensor data 404) that user 204 has switched from the first to the second transportation mode; 2) determining (e.g., based on another type of sensor data such as geolocation sensor data 402) a confidence metric representative of a confidence level that the user has switched from the first to the second transportation mode; and and 3) determining that the confidence metric satisfies a confidence threshold that has been predetermined to implement the error preference (e.g., predetermined to make it easier to err on the side of failing to detect a true transportation mode switch rather than positively detecting a false transportation mode switch).

System 100 may be configured to make transportation mode determinations as accurately as possible. However, by using a confidence metric and a confidence threshold in this way, system 100 may be configured to provide desirable behavior when making an accurate transportation mode determination is difficult. For example, the example above describes how the confidence threshold may be set in such a way to make system 100 err on the side of providing too much navigational guidance rather than too little. In other examples, if desirable for a particular implementation, the confidence threshold could also be set in such a way to make system 100 err on the side of providing too little navigational guidance (e.g., erring on the side of positively detecting a false transportation mode switch) rather than providing too much (e.g., erring on the side of failing to detect a true transportation mode switch).

Confidence metrics used for implementations of system 100 employing a confidence scheme may be determined in any manner as may serve a particular implementation. For instance, in one embodiment, system 100 may be configured to determine a confidence metric by identifying a change in a pattern of motion sensor data 404 (e.g., such as illustrated to occur at time 410-2 in FIG. 4) indicating that mobile navigation device 202 has possibly (or likely) switched from an automotive transportation mode to a non-vehicular transportation mode. The motion sensor data alone may indicate that a change is possible or even likely, but may not be sufficient for system 100 to conclusively determine that the transportation mode has switched. As such, system 100 may account for other sensor data such as geolocation sensor data 402 to determine the confidence metric representative of the likelihood that the transportation mode has actually switched. For example, if geolocation sensor data 402 indicates that the speed of movement of mobile navigation device 202 is much slower since the pattern of motion sensor data changed than it was shortly before, the confidence metric may be determined to be higher than if the speed has remained unchanged and/or is at a level higher than is typically possible to move without a vehicle. As another example, if geolocation sensor data 402 indicates that mobile navigation device 202 is not squarely on a particular path (e.g., is on the side of the road or slightly off the road) or is near a point of interest, the confidence metric may be determined to be higher than if the mobile navigation device is in the middle of the road or nowhere near a point of interest. In still other examples, confidence metrics may be determined and/or adjusted and refined based on other indications of the transportation mode switch that may be detected, such as that mobile navigation device 202 dwells at a point of interest, that a large number of steps has been detected rather than a small number (i.e., the confidence metric may be higher after one hundred consecutive steps are detected than after three consecutive steps are detected), and so forth.

In some examples, the confidence metric may be an instantaneous confidence metric determined based only on the most current sensor data available. In other examples, the confidence metric may be more complex or sophisticated so as to account for dynamic changes in sensor data being detected. For instance, a confidence metric employed by system 100 may be determined as a rolling average of instantaneous confidence metrics. In this way, the impact of outlier sensor data and/or misleading sensor data detected based on extraordinary events (e.g., user 204 accidentally dropping mobile navigation device 202, user 204 passing mobile navigation device 202 to someone else in the vehicle, etc.) may be minimized, thereby making the confidence metric more accurate and reliable in certain examples.

Additionally, like confidence metrics, confidence thresholds used for implementations of system 100 employing a confidence scheme may also be predetermined and set, as well as adjusted and refined, in any manner as may serve a particular implementation. For instance, in certain implementations, a confidence threshold may be set to a simple threshold (e.g., 50%, 75%, etc.) that may be predetermined by the manufacturer of system 100 or based on a user preference or setting. In other implementations, the confidence threshold may be more sophisticated, such as by implementing hysteresis to prevent system 100 from toggling back and forth between detected transportation modes by requiring a relatively large degree of confidence for a determination of a transportation mode switch.

Additionally, system 100 may adjust and refine the confidence threshold used based on feedback from user 204 or elsewhere. For example, if system 100 determines that a transportation mode switch has occurred and suspends a feature of navigational guidance only to have the feature immediately and manually resumed by user 204, system 100 may determine that the transportation mode switch determination was false, and may adjust the confidence threshold to avoid such false determinations in the future. In some examples, more sophisticated machine learning, artificial intelligence, and other such technologies may similarly be used to help system 100 improve its ability to accurately detect transportation mode switching.

Feature/display status 408 relates to both what is displayed by mobile navigation device 202 over the course of timeline 400, as well as which navigational guidance features are active or suspended during this time (e.g., based on determinations of transportation mode switching and so forth). As noted in FIG. 4, FIG. 5 illustrates a feature/display status 500 for mobile navigation device 202 as user 204 navigates from starting location 302 to the stop on DDD Parkway (e.g., from time 410-1 to 410-2), while FIG. 6 illustrates a feature/display status 600 for mobile navigation device 202 during the stop (i.e., after the transportation mode switch from automotive to non-vehicular transportation mode at time 410-2).

Figure 5:
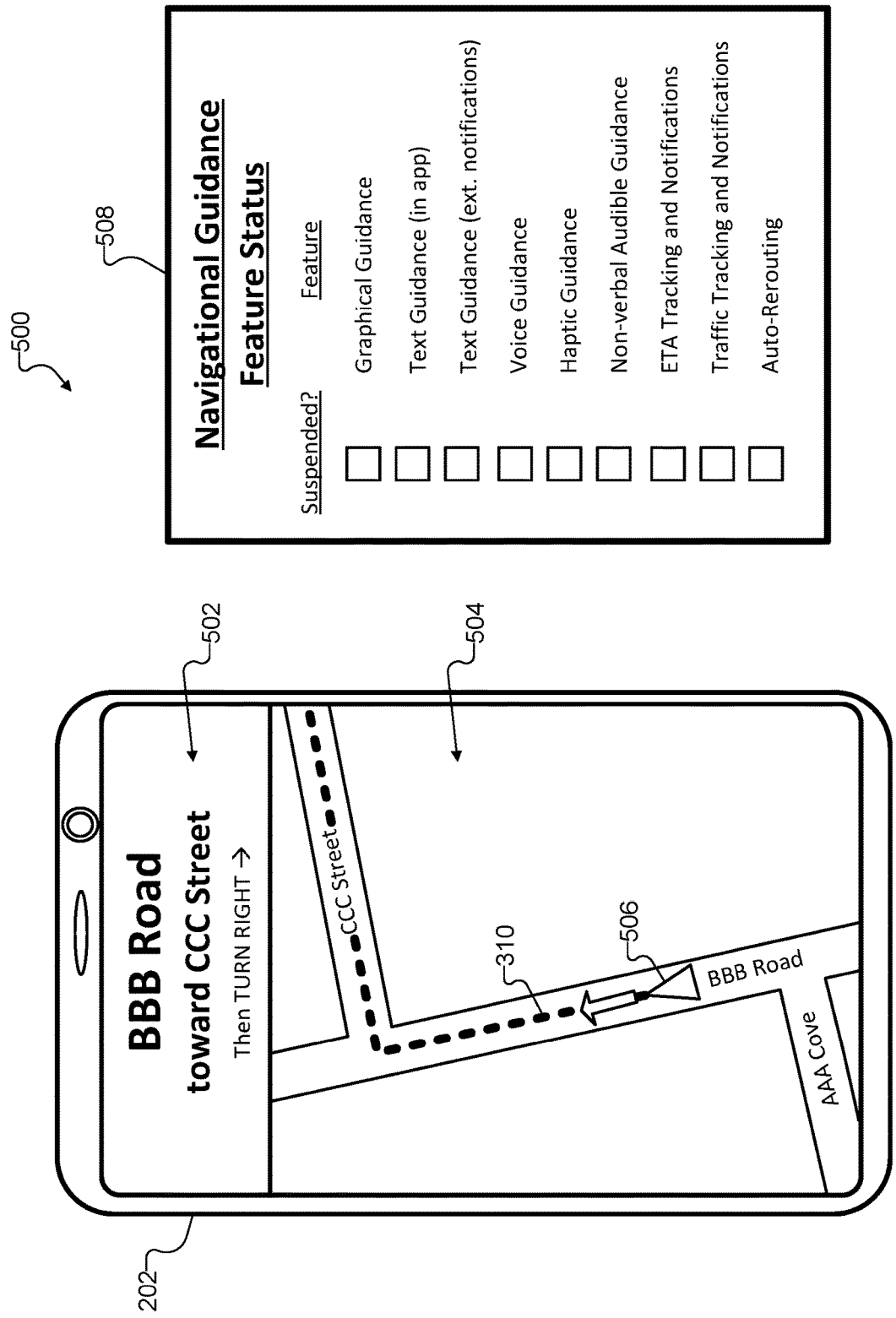
FIG. 5 illustrates an exemplary navigational guidance presentation provided by a mobile navigation device and exemplary statuses of various features of the mobile navigation device for a particular portion of the timeline of FIG. 4 according to principles described herein.
Figure 6:
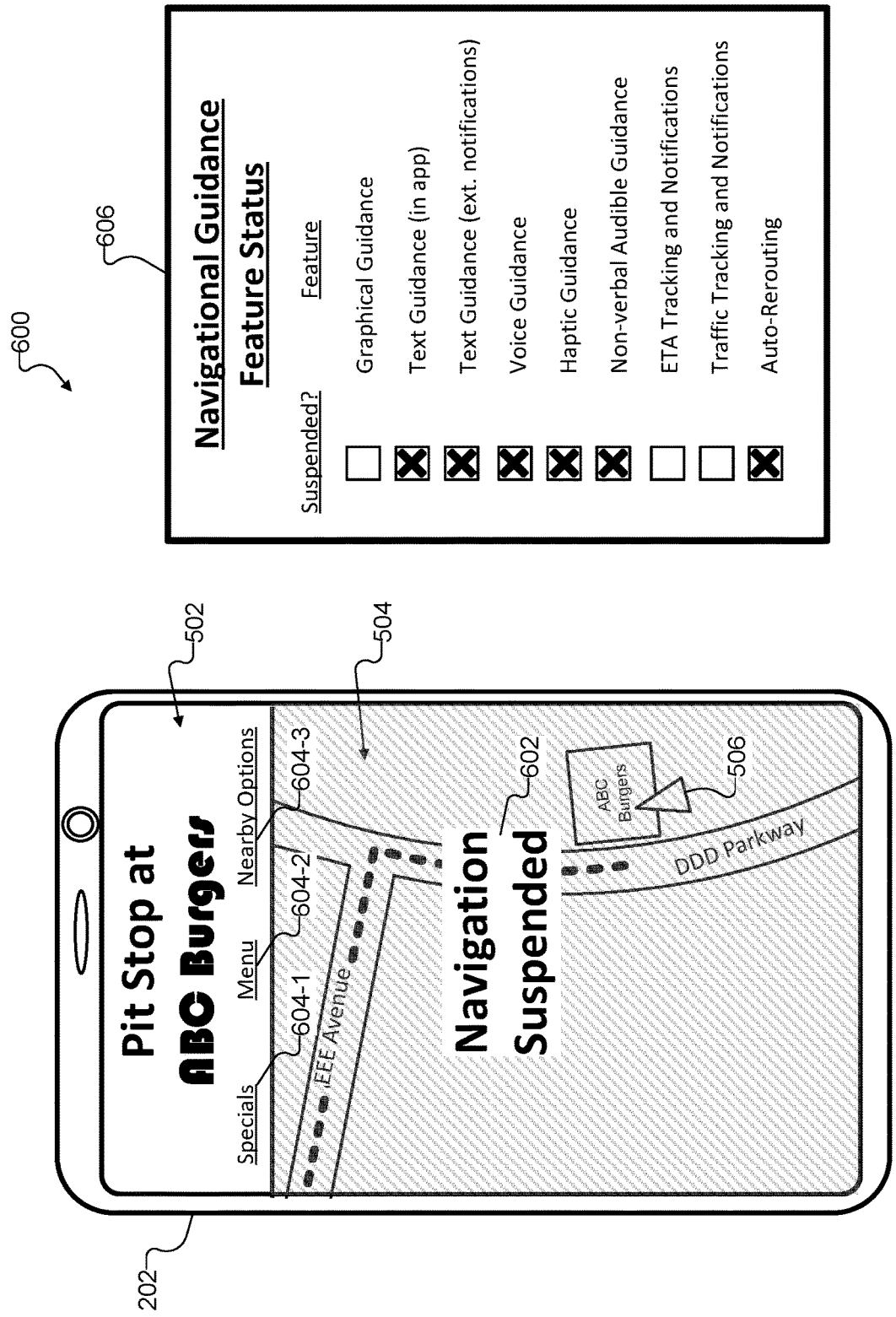
FIG. 6 illustrates an exemplary presentation by the mobile navigation device and other exemplary statuses of the features of the mobile navigation device for another particular portion of the timeline of FIG. 4 according to principles described herein.

Referring now to FIG. 5, feature/display status 500 depicts an exemplary navigational guidance presentation provided by mobile navigation device 202 and exemplary statuses of various features of mobile navigation device 202 for the portion of timeline 400 indicated in FIG. 4. As shown in FIG. 5, mobile navigation device 202 may be implemented in this example as a personal mobile device (e.g., a smartphone device, tablet device, etc.) that has a screen configured to present a textual guidance pane 502 and a graphical guidance pane 504.

As mobile navigation device 202 is used to navigate route 310, textual guidance pane 502 may be configured to textually indicate one or more instructions such as instructions from navigational guidance 312, described above. At the moment in time illustrated in FIG. 5, for example, mobile navigation device 202 has traversed AAA Cove and made the left turn onto BBB Road and is now heading toward CCC Street, where the instructions of navigational guidance 312 indicate that a right turn should be made. As such, the textual guidance in textual guidance pane 502 indicates the current detected location of mobile navigation device 202 ("BBB Road"), the current action being performed with respect to route 310 (mobile navigation device 202 is traveling "toward CCC Street"), and the next action that is to be performed (mobile navigation device 202 is to "then TURN RIGHT→" upon reaching CCC Street).

Feature/display status 500 further shows graphical guidance pane 504 in the presentation of mobile navigation device 202. As mobile navigation device 202 is used to navigate route 310, graphical guidance pane 504 may be configured to graphically indicate one or more instructions such as instructions from navigational guidance 312. For example, as shown, an icon 506 representative of the present geolocation of mobile navigation device 202 is depicted on a map within graphical guidance pane 504 as mobile navigation device 202 traverses route 310, which is shown as a dotted line being traversed in real time by icon 506.

Textual guidance provided in textual guidance pane 502 and graphical guidance provided in graphical guidance pane 504 may be correlated with one another. For example, as shown, the present location on "BBB Road" indicated textually in textual guidance pane 502 is graphically shown by icon 506 in graphical guidance pane 504, and the upcoming right turn onto CCC Street indicated in textual guidance pane 502 is further indicated by the graphical representation on the map of graphical guidance pane 504. Additionally, along with textual and graphical navigational guidance explicitly depicted on the screen of mobile navigation device 202 in FIG. 5, it will be understood that various other navigational guidance features not explicitly depicted may also be implemented by mobile navigation device 202.

For example, along with textual guidance presented within a geospatial navigation application (e.g., textual guidance presented in textual guidance pane 502 shown in FIG. 5), the available navigational guidance features may further include textual guidance presented in external notifications (e.g., pop-up notifications, drop down notifications, etc.) that are provided when mobile navigation device 202 is actively presenting a different application other than the geospatial navigation application. As another example, available navigational guidance features may include a voice guidance feature that audibly presents instructions corresponding, for example, to the instructions textually presented in textual guidance pane 502. In still other examples, the available navigational guidance features may include a haptic guidance feature, a non-verbal audible guidance feature, a non-graphical visible feature, or the like. For instance, such features may provide more subtle indications, reminders, or emphases (e.g., by way of a vibration or other haptic output, by way of a chime or other non-verbal audible output, by way of an LED flashing or other non-graphical visible output, etc.) that an action is to be performed (e.g., a turn is to be made), that a mistaken action (e.g., a wrong turn) has been performed and needs to be corrected, or the like. As mentioned above, other available navigational guidance features may relate to ETA tracking and notifications (e.g., notifications regarding when destination location 304 is projected to be reached at a present rate of travel of route 310), traffic tracking and notifications (e.g., notifications regarding real-time traffic events on route 310), auto-rerouting (e.g., automatic adjustments made to route 310 to save time when unexpected traffic or other incidents appear on the route as previously set forth), or any other navigational feature as may serve a particular implementation.

In FIG. 5, feature/display status 500 illustrates the status of various available navigational guidance features in a navigational guidance feature status 508. Specifically, as shown, status 508 illustrates a list of available features that have been described (e.g., "Graphical Guidance," "Text Guidance (in app)," "Text Guidance (external notifications)," "Voice Guidance," "Haptic Guidance," "Non-verbal Audible Guidance," "ETA Tracking and Notifications," "Traffic Tracking and Notifications," and "Auto-Rerouting"), along with a respective box next to each one that is marked if the respective feature is currently suspended. As shown in FIG. 5, none of the available navigational guidance features may be suspended while mobile navigation device 202 is being actively used for navigation (i.e., between times 410-1 and 410-2 on timeline 400). As such, it will be understood that the geospatial navigation application presented on mobile navigation device 202 is fully operational with all available features (or at least a default subset or user-enabled subset thereof) active and enabled.

As indicated by feature/display status 408 in FIG. 4, however, the feature/display status of mobile navigation device 202 may change at time 410-2 when system 100 detects the switch to the non-vehicular transportation mode. Specifically, after time 410-2, feature/display status 500 in FIG. 5 may be replaced by feature/display status 600 in FIG. 6.

In FIG. 6, feature/display status 600 depicts another exemplary presentation by mobile navigation device 202 and other exemplary statuses of the navigational guidance features of mobile navigation device 202 for the portion of timeline 400 after time 410-2. In this example, system 100 determines that a stop has been made and is configured to assume that the stop is related to the point of interest near the current geolocation of mobile navigation device 202 (i.e., "ABC Burgers," in this example, where icon 506 is detected).

As shown, system 100 may indicate that the stop has been detected (e.g., by way of the detected transportation mode switch), and that one or more navigational guidance features have been suspended. For example, as shown in textual guidance pane 502, the detection that a stop has been made may be indicated by, for example, displaying a message such as "Pit Stop at ABC Burgers," or the like. Additionally, as shown, graphical guidance in graphical guidance pane 504 may be grayed out or otherwise indicated to be inactive while a message 602 (e.g., "Navigation Suspended") is overlaid on graphical guidance pane 504.

As long as user 204 is determined to be employing the new transportation mode (e.g., walking around at the ABC Burgers point of interest in this example), system 100 may further be configured to provide helpful information, or to otherwise add value to the stop, by way of mobile navigation device 202. For example, system 100 may be configured to 1) detect, in response to the determination at time 410-2 that user 204 switches transportation modes, a current geolocation of the mobile navigation device; 2) identify location-customized information associated with the current geolocation of the mobile navigation device; and 3) present the location-customized information to user 204 by way of mobile navigation device 202 and while user 204 employs the new transportation mode (e.g., while user 204 continues to walk around external to his or her automobile).

Location-customized information presented in this way may include any information as may serve a particular implementation. For instance, as shown in FIG. 6, various links 604 (e.g., links 604-1 through 604-3) may be provided to enable user 204 to view location-customized information related to various types of "specials" (link 604-1) such as advertisements, coupons, loyalty programs, or the like being offered by the point of interest; a "menu" (link 604-2) for the point of interest if applicable (e.g., a menu of items offered by ABC Burgers); various "nearby options" (link 604-3) providing similar points of interest in the area (e.g., other nearby fast food restaurants having similar prices, reviews, types of food, etc., as ABC Burgers); or any other location-customized information as may serve a particular implementation.

Depending on the type of point of interest user 204 has been detected to be stopped at, information provided in this way may be customized to be helpful and relevant for that point of interest. For example, if the point of interest were a historical landmark rather than a fast food restaurant, links 604 may include historical information (e.g., videos, photos, and/or textual descriptions of historical events, etc.) rather than specials and menus. As another example, if the point of interest user 204 stopped at were a bus stop or train station, links 604 may include information or discount coupons related to hailing a taxi service or other transportation. As yet another example, if the point of interest user 204 stopped at were a gas station, links 604 may include information about or links to applications related to a gas station loyalty program allowing the user to earn and/or spend points for patronizing the particular gas station chain.

Along with location-customized information associated with the point of interest or other points of interest nearby, system 100 may further be configured to direct mobile navigation device 202 to provide other types of useful information while user 204 is detected to be off the road and walking around at the point of interest. For example, system 100 may direct mobile navigation device 202 to present information about the running duration of the stop (i.e., how long it has been since the transportation mode was detected to change), how much longer user 204 can remain at the point of interest without missing an appointment at the destination location, and so forth.

As illustrated by the presentation of mobile navigation device 202 in FIG. 6, system 100 may suspend one or more features of the navigational guidance being provided by mobile navigation device 202 upon determining that user 204 has switched from the automotive transportation mode to the non-vehicular transportation mode. As with feature/display status 500 above, feature/display status 600 illustrates the status of various available navigational guidance features in a navigational guidance feature status 606. Specifically, as shown, status 606 illustrates the same list of available features shown above in status 508, along with the respective boxes illustrating which of the features are suspended. However, whereas none of the available navigational guidance features were shown to be suspended in status 508 while mobile navigation device 202 was being actively used for navigation (i.e., before time 410-2), various navigational guidance features are marked as being suspended in status 606 after user 204 has been detected to switch transportation modes (i.e., after time 410-2). Specifically, as shown, various features of the navigational guidance may be suspended in response to the determining that user 204 switches transportation modes, including both textual guidance features ("Text Guidance (in app)" and "Text Guidance (external notifications)"), the voice guidance feature, the haptic guidance feature, the non-verbal audible guidance feature, and the auto-rerouting guidance feature.

In the example shown, the graphical guidance feature, the ETA tracking feature, and the traffic tracking feature are not suspended, although it will be understood that they may be suspended in certain implementations. By leaving these features active, system 100 may allow for the grayed out map in graphical guidance pane 504 to continue to show the current geolocation of mobile navigation device 202 by way of icon 506, as well as for traffic to continue to be monitored and the ETA of the user's arrival at destination location 304 to continue to be updated as the ETA may change based on the duration of the stop at the point of interest. However, by suspending the other navigational guidance features shown, no undesirable voice guidance, haptic outputs, textual notifications, chimes, or auto-rerouting announcements will be provided while the user is spending time at the point of interest and taking a break from navigating route 310.

System 100 may determine which navigational guidance features to suspend or to leave active in status 606 in any suitable manner. For example, the determination may be made based on preconfigured user settings indicating user preferences of what guidance features are desirable in different situations. Such user preferences may be specific to different transportation modes in certain examples. For instance, as one example, user 204 may indicate that he or she prefers for voice guidance to be suspended when switching from driving to walking, while preferring for voice guidance to remain active when switching from driving to cycling. Specific preferences related to specific types of public transportation may similarly be provided. In other examples, the navigational guidance features suspended and/or left active may be determined in other ways, such as by predetermined settings built into geospatial navigation application software or by contextual clues detected by system 100 or other considerations. For instance, if battery power on mobile navigation device 202 is running low, system 100 may be more likely to suspend more features or to completely suspend or close down the geospatial navigation application to save battery than if there is plenty of battery power. Accordingly, while certain features in status 606 are shown to be suspended or left enabled for this particular example, it will be understood that various different features and combinations of features may instead be suspended in response to this particular transportation mode switch or other transportation mode switches that may be detected.

Figure 7:
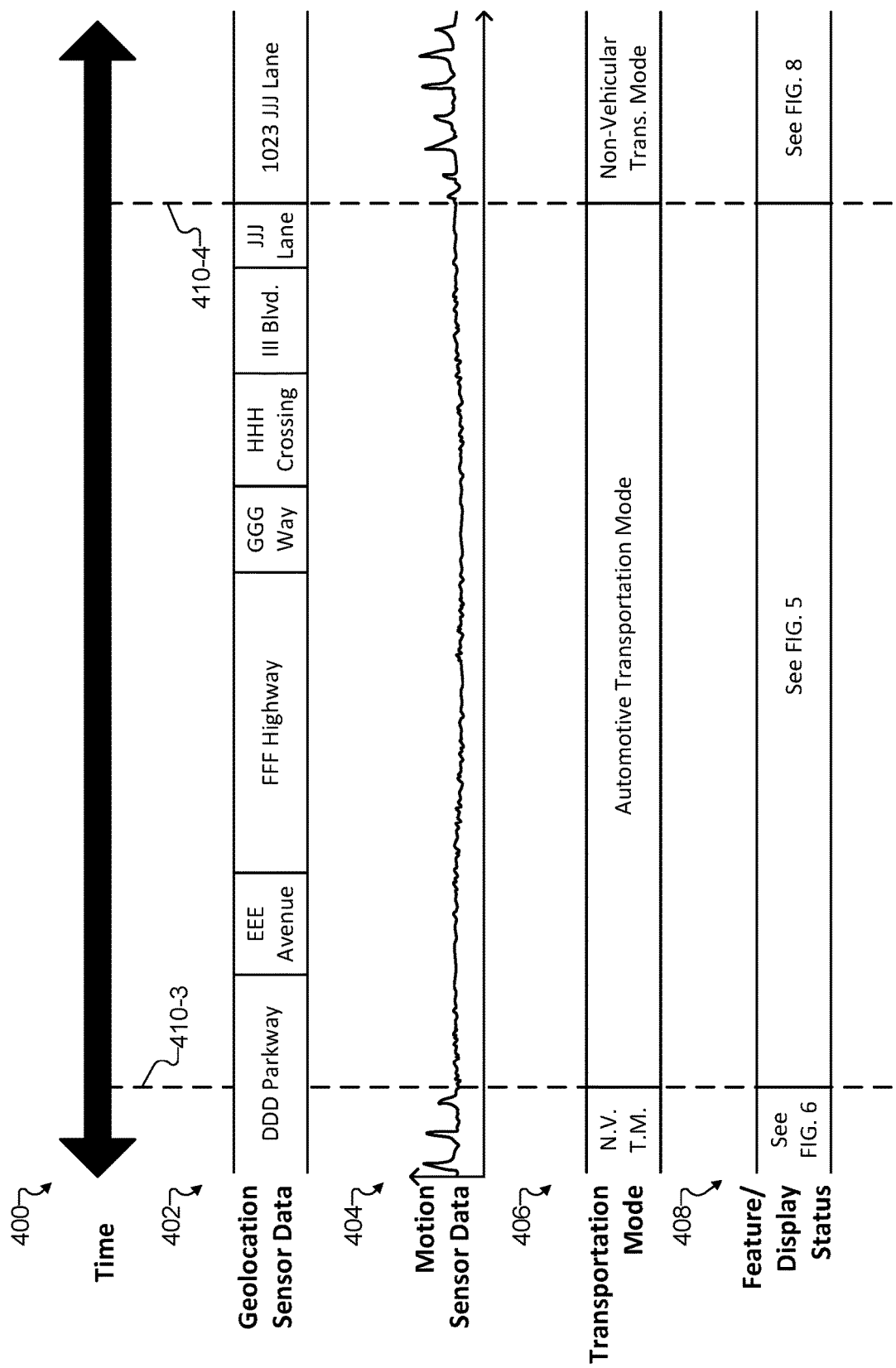
FIG. 7 illustrates a continuation of the exemplary timeline of FIG. 4 as the mobile navigation device is carried by the user traversing the remainder of the route of FIG. 3A according to principles described herein.

After user 204 completes his or her business at the point of interest (e.g., after finishing lunch at ABC Burgers, for example), user 204 may continue navigating route 310 toward destination location 304. To illustrate, FIG. 7 shows a continuation of timeline 400 as mobile navigation device 202 is carried by user 204 while traversing the remainder of route 310. Specifically, as shown at time 410-3 subsequent to the suspending of the navigational guidance feature at time 410-2, system 100 may determine that user 204 switches back from the non-vehicular transportation mode (abbreviated "N.V.T.M." in FIG. 7 due to space constraints) to the automotive transportation mode that user 204 had previously employed to travel along route 310. In response to this determination of the transportation mode switch back to the automotive transportation mode, system 100 may resume the one or more navigational guidance features that were suspended. For example, if, as shown in FIG. 6, system 100 previously suspended the textual guidance features, the voice guidance feature, the haptic guidance feature, the non-verbal audible guidance feature, and the auto-rerouting feature, system 100 may, at time 410-3, resume any or all of these suspended features.

As such, the feature/display status 408 in FIG. 7 indicates that the feature/display status of mobile navigation device 202 after time 410-3 may again be illustrated by FIG. 5, where active navigational guidance is displayed and otherwise presented by mobile navigation device 202 and all of the features of mobile navigation device 202 are actively enabled. In this mode, as shown in FIG. 7, mobile navigation device 202 may help user 204 navigate along the rest of route 310, from DDD Parkway, onto EEE Avenue, FFF Highway, GGG Way, HHH Crossing, III Boulevard, and JJJ Lane to arrive at destination location 304 at 1023 JJJ Lane.

System 100 may determine that the transportation mode has switched back to the automotive transportation mode in any manner as may serve a particular implementation. For instance, in certain implementations, system 100 may use geolocation sensor data 402 to determine where the vehicle was positioned when user 204 was first detected to be walking, and may determine that the transportation mode switches when user 204 returns to that position and stops walking (e.g., indicating that user 204 is now seated in the vehicle again and getting ready to depart the point of interest and get back on route 310). In these examples, navigation may be provided to remind user 204 how to get back on route 310 (e.g., which way to turn out of the parking lot of the point of interest, etc.), even before user 204 begins driving at full speed. In other implementations, system 100 may use geolocation sensor data 402 and/or motion sensor data 404 to ensure that user 204 is again moving at a speed that could only be accomplished by way of a vehicle. In this way, the navigational guidance features may not be reenabled until user 204 is actually on the road again and navigating route 310. This may be desirable, for example, to help avoid a situation in which unwanted navigational guidance (e.g., voice guidance, etc.) is provided while user 204 is sitting in the car eating lunch, waiting for a companion to get back in the vehicle after the stop, or the like.

As shown in FIG. 7, at time 410-4, system 100 may detect that user 204 has switched back to employing the non-vehicular transportation mode (e.g., has exited the vehicle and is walking). Unlike in the example of FIG. 4 where the transportation mode switch was associated with an unexpected point of interest stop, however, at time 410-4, mobile navigation device 202 is now known to be located at destination location 304 (i.e., 1023 JJJ Lane). While one objective of system 100 prior to arriving at destination location 304 may have been to intelligently detect unexpected stops to avoid annoying user 204 with unnecessary navigational guidance, system 100 may have a slightly different objective upon the arrival of mobile navigation device 202 to destination location 304. Specifically, at this point (i.e., after time 410-4), system 100 may enable and/or engage a feature in response to the detected change in transportation mode, rather than suspending a feature as described above. For example, system 100 may be configured, at this point, to engage and/or enable features that both provide valuable and interesting information to user 204 similar to that described above in relation to FIG. 6, as well as, in certain examples, that incentivize user 204 to continue using mobile navigation device 202 (and the geospatial navigation application executing on mobile navigation device 202 in particular) even though the primary objective of navigating to the destination has been accomplished.

If system 100 incentivizes user 204 to continue to use the mobile navigation device and/or the geospatial navigation application at destination location 304, system 100 may receive various additional information that may help further enrich and improve the geospatial navigation application for future use by user 204 and/or other users of a geospatial navigation service. For example, a service provider of such a geospatial navigation application may collect photos and/or videos captured internally and/or externally at various points of interest to provide useful information regarding those points of interest to future users. Additionally, floor plan information, menu information, hours of operation information, user review information, emotional response information (i.e., information representative of the impression of user 204 to the environment of the point of interest), and/or various other types of information related to the point of interest may be collected by system 100 from users willing to provide such information after navigating to the point of interest. As such, system 100 may provide incentives (e.g., reward points in a geospatial navigation application incentive program, discount coupons for use at the point of interest, etc.) to user 204 if user 204 collects some of the desired information.

Figure 8:
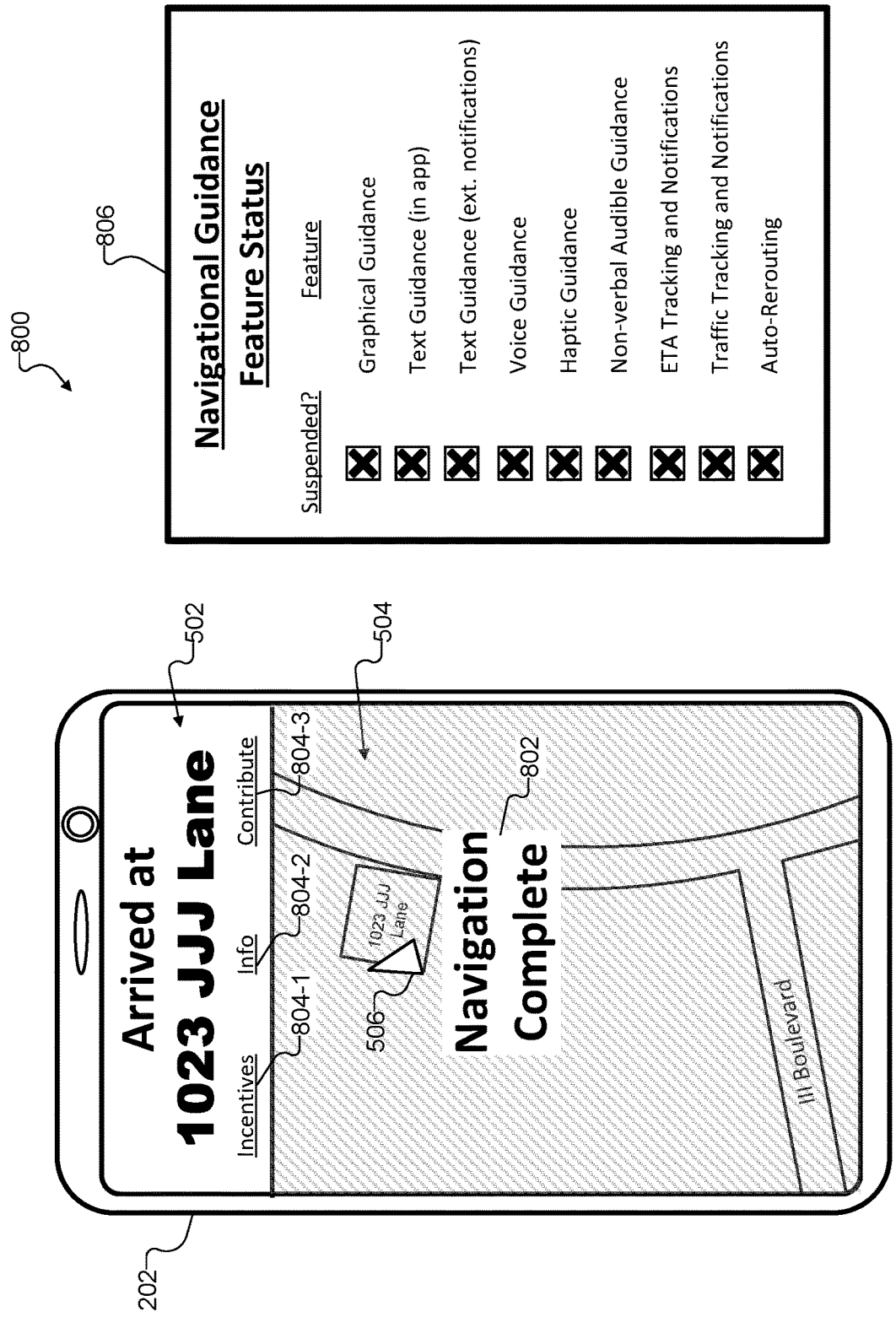
FIG. 8 illustrates an exemplary presentation by the mobile navigation device and other exemplary statuses of the features of the mobile navigation device for a particular portion of the timeline of FIG. 7 according to principles described herein.

To illustrate, FIG. 8 depicts a feature/display status 800 that shows yet another exemplary presentation by mobile navigation device 202 and other exemplary statuses of the navigational guidance features of mobile navigation device 202 for a portion of timeline 400 after time 410-4 (i.e., after user 204 has arrived at destination location 304). As shown, mobile navigation device 202 presents an indication in either or both of panes 502 and 504 that system 100 has detected that mobile navigation device 202 has arrived at destination location 304 and/or that the transportation mode is again switched from the automotive to the non-vehicular transportation mode.

For example, as shown in textual guidance pane 502 in FIG. 8, the detection that the destination has been reached may be indicated by, for example, displaying a message such as "Arrived at 1023 JJJ Lane," or the like. Additionally, as shown, graphical guidance in graphical guidance pane 504 may be grayed out or otherwise indicated to be inactive while a message 802 (e.g., "Navigation Complete") is overlaid on graphical guidance pane 504.

As long as user 204 is determined to be employing the new transportation mode (e.g., walking around at the 1023 JJJ Lane point of interest in this example), system 100 may further be configured to provide helpful information and/or to attempt to otherwise incentivize user 204 to continue to use the geospatial navigation application. For example, as shown in FIG. 8, various links 804 (e.g., links 804-1 through 804-3) may be provided to enable user 204 to view "incentives" (link 804-1) offered by the geospatial navigation application for performing certain actions (e.g., points for providing a photo of an external facade of the 1023 JJJ Lane location, etc.), "info" (link 804-2) related to the point of interest (e.g., any of the types of location-customized information described herein or other helpful information), or the like. As another example, system 100 may direct mobile navigation device 202 to present an option for user 204 to "contribute" (link 804-3) data to benefit future users or otherwise help build and improve the geospatial navigation service. For instance, as mentioned above, the user may contribute photos, videos, emotional impressions, reviews, any combination thereof, or any other information as may serve a particular implementation.

As in the presentation of mobile navigation device 202 in FIG. 6, the presentation in FIG. 8 illustrates that system 100 may suspend one or more features of the navigational guidance being provided by mobile navigation device 202 upon determining that user 204 has again switched from the automotive transportation mode to the non-vehicular transportation mode. In this case, a navigational guidance feature status 806 specifically indicates that all of the navigational guidance features may be suspended. This is because the navigation is now determined to be complete. By suspending or shutting down each of the navigational guidance features shown in status 806, system 100 may help mobile navigation device 202 save battery and avoid providing undesirable instructions to user 204. At the same time, it will be understood that, as described above, system 100 may incentivize user 204 to not exit the geospatial navigation application altogether, but rather to continue using it (e.g., to browse incentives and information, to contribute location-specific data, etc.) at the destination location.

Figure 9:
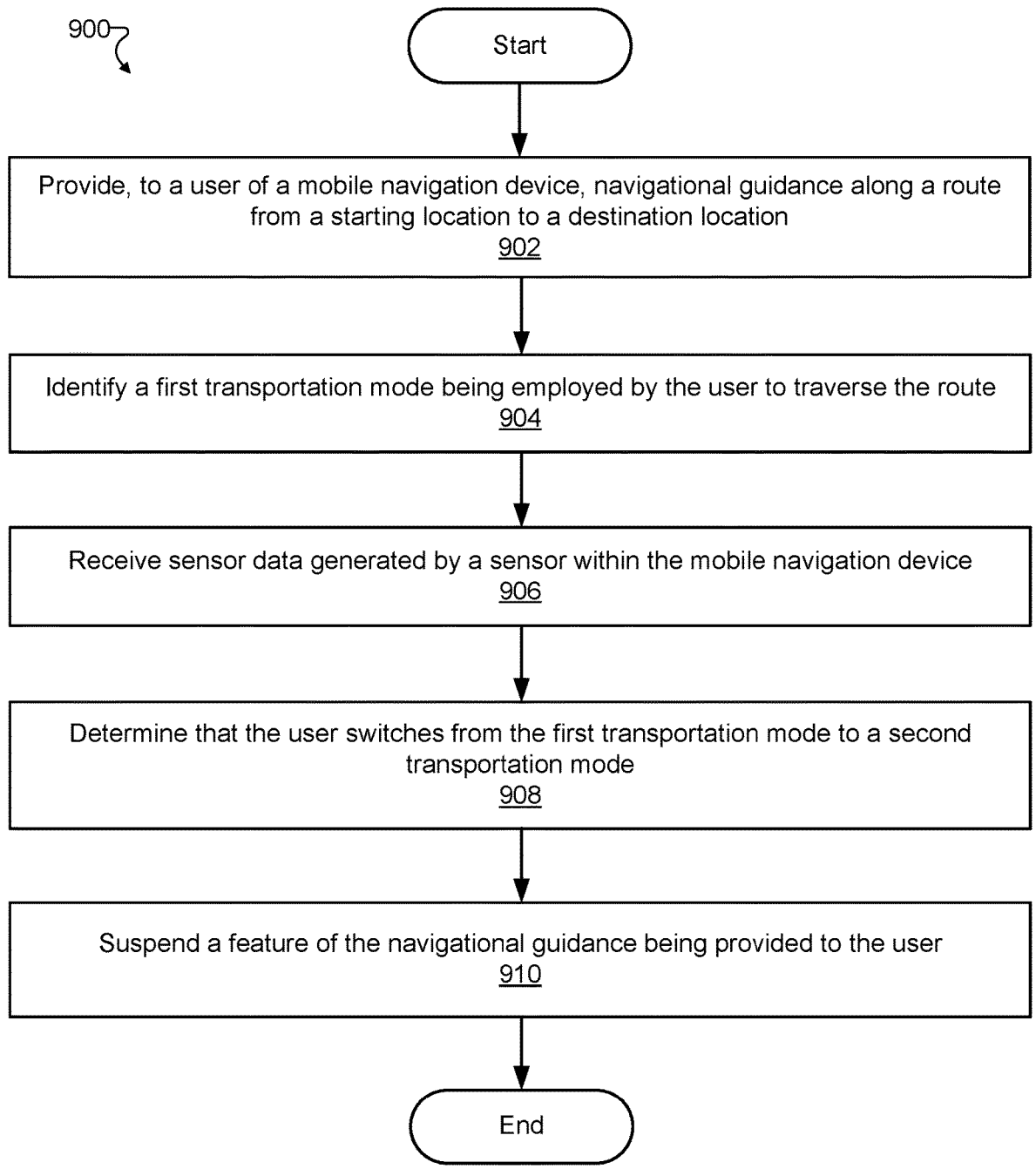
FIG. 9 illustrates a geospatial navigation method for automatically suspending navigational guidance provided to a user of a mobile navigation device according to principles described herein.

FIG. 9 illustrates an exemplary method 900 for automatically suspending navigational guidance provided to a user of a mobile navigation device. While FIG. 9 illustrates exemplary operations according to one embodiment, other embodiments may omit, add to, reorder, and/or modify any of the operations shown in FIG. 9. One or more of the operations shown in FIG. 9 may be performed by system 100, any components included therein, and/or any implementation thereof.

In operation 902, a geospatial navigation system may provide navigational guidance along a route from a starting location to a destination location. For example, the geospatial navigation system may provide the navigational guidance to a user of a mobile navigation device. Operation 902 may be performed in any of the ways described herein.

In operation 904, the geospatial navigation system may identify a first transportation mode being employed by the user to traverse the route from the starting location to the destination location. Operation 904 may be performed in any of the ways described herein.

In operation 906, the geospatial navigation system may receive sensor data generated by a sensor within the mobile navigation device. For example, the geospatial navigation system may receive the sensor data while the navigational guidance is being provided as part of operation 902. Operation 906 may be performed in any of the ways described herein.

In operation 908, the geospatial navigation system may determine that the user switches from the first transportation mode to a second transportation mode. For instance, the geospatial navigation system may make this determination based on the sensor data received in operation 906. In some examples, the geospatial navigation system may determine that the user switches from the first to the second transportation mode while the navigational guidance is being provided as part of operation 902. Operation 908 may be performed in any of the ways described herein.

In operation 910, the geospatial navigation system may suspend a feature of the navigational guidance being provided to the user. For example, the geospatial navigation system may suspend the feature of the navigational guidance in response to the determination in operation 908 that the user switches from the first to the second transportation mode. Operation 910 may be performed in any of the ways described herein.

In some examples, a non-transitory computer-readable medium storing computer-readable instructions may be provided in accordance with the principles described herein.

The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 10:
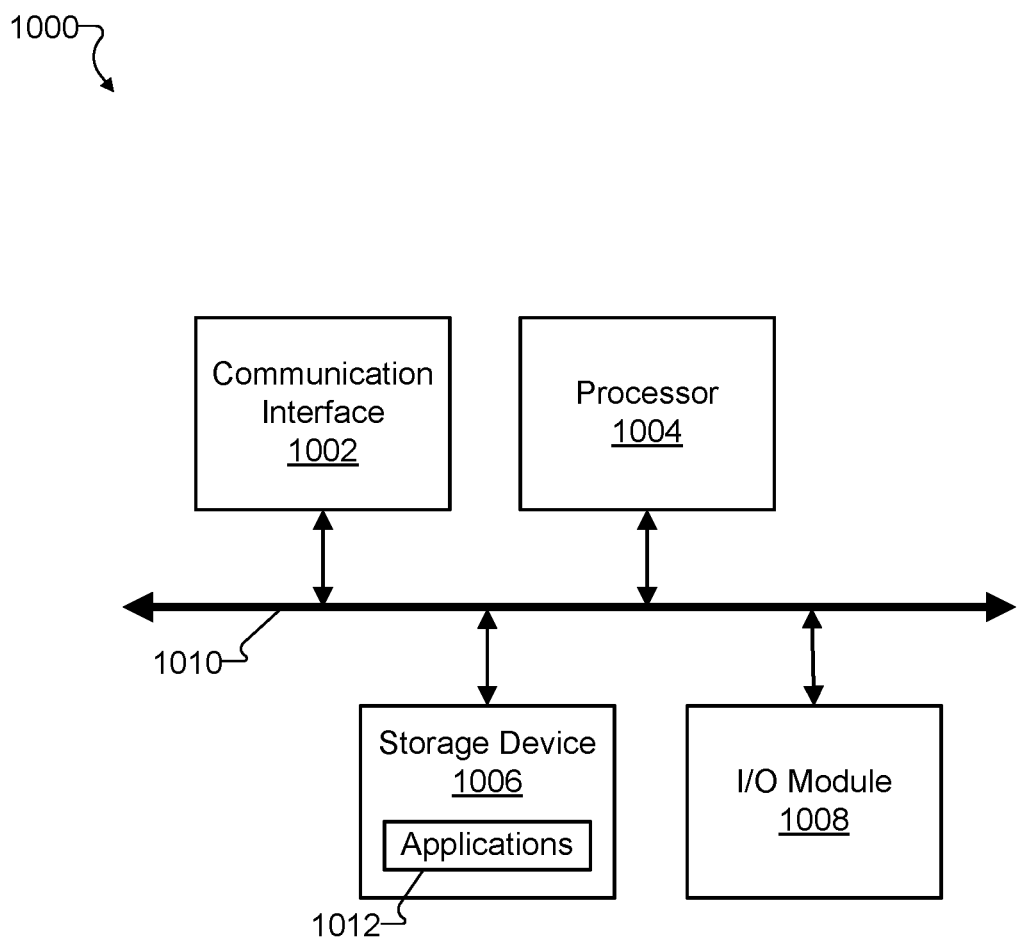
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output ("I/O") module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1000. For example, storage facility 102 may be implemented by storage device 1006, and processing facility 104 may be implemented by processor 1004.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by a geospatial navigation system, a route from a starting location to a destination location, the route planned based on user input representative of a request by a user of a mobile navigation device implemented by a mobile computing device;
   providing, by the geospatial navigation system to the user, navigational guidance along the route;
   identifying, by the geospatial navigation system, a first transportation mode being employed by the user to traverse the route;
   receiving, by the geospatial navigation system while the navigational guidance is being provided, sensor data that includes motion data and geolocation data and is generated by one or more sensors within the mobile navigation device;
   determining, by the geospatial navigation system while the navigational guidance is being provided and based on the sensor data, that the user switches from the first transportation mode to a second transportation mode, the determining that the user switches from the first to the second transportation mode including:
  determining, based on the motion data, that the user has possibly switched from the first to the second transportation mode,
    determining, based on the geolocation data, a confidence metric representative of a confidence level that the user actually switched from the first to the second transportation mode, and
    determining that the confidence metric satisfies a confidence threshold;
detecting, by the geospatial navigation system based on the determining that the user switches from the first to the second transportation mode, that the user is making a stop along the route that was not planned for in the determining of the route; and
suspending, by the geospatial navigation system in response to the detecting that the user is making the stop that was not planned for, a feature of the navigational guidance being provided to the user.

2. The method of claim 1, wherein the one or more sensors within the mobile navigation device include:
  is a motion sensor integrated into the mobile navigation device and generating the motion data to be representative of movement of the mobile navigation device as the user carries the mobile navigation device; and
  a geolocation sensor generating the geolocation data to be representative of a geolocation of the mobile navigation device as the user carries the mobile navigation device.

3. The method of claim 1, wherein the feature of the navigational guidance that is suspended in response to the detecting that the user is making the stop that was not planned for includes at least one of:
  a voice guidance feature;
  a textual guidance feature;
  a graphical guidance feature;
  a haptic guidance feature; and
  a non-verbal audible guidance feature.

4. The method of claim 1, further comprising:
  determining, by the geospatial navigation system subsequent to the suspending of the feature of the navigational guidance, that the user switches back from the second to the first transportation mode; and
  resuming, by the geospatial navigation system in response to the determining that the user switches back from the second to the first transportation mode, the feature of the navigational guidance.

5. The method of claim 1, wherein:
  the first transportation mode is an automotive transportation mode; and
  the second transportation mode is a non-vehicular transportation mode.

6. The method of claim 1, further comprising:
  detecting, by the geospatial navigation system based on the geolocation data and in response to the determining that the user is making the stop along the route that was not planned for, a geolocation of the mobile navigation device during the stop along the route that was not planned for;
  identifying, by the geospatial navigation system, location-customized information associated with the geolocation of the mobile navigation device during the stop along the route that was not planned for; and
  presenting, by the geospatial navigation system, the location-customized information to the user, the location-customized information presented by way of the mobile navigation device while the user employs the second transportation mode.

7. The method of claim 1, wherein the confidence threshold is configured to implement an error preference to err by failing to detect a true transportation mode switch rather than positively detecting a false transportation mode switch.

8. A system comprising:
  a memory storing instructions; and
  a processor communicatively coupled to the memory and configured to execute the instructions to:
    determine a route from a starting location to a destination location, the route planned based on user input representative of a request by a user of a mobile navigation device implemented by a mobile computing device;
    provide, to the user, navigational guidance along the route;
    identify a first transportation mode being employed by the user to traverse the route;
    receive, while the navigational guidance is being provided, sensor data that includes motion data and geolocation data and is generated by one or more sensors within the mobile navigation device;
    determine, while the navigational guidance is being provided and based on the sensor data, that the user switches from the first transportation mode to a second transportation mode, the determining that the user switches from the first to the second transportation mode including:
      determining, based on the motion data, that the user has possibly switched from the first to the second transportation mode,
      determining, based on the geolocation data, a confidence metric representative of a confidence level that the user actually switched from the first to the second transportation mode, and
      determining that the confidence metric satisfies a confidence threshold;
    detect, based on the determining that the user switches from the first to the second transportation mode, that the user is making a stop along the route that was not planned for in the determining of the route; and
    suspend, in response to the detecting that the user is making the stop that was not planned for, a feature of the navigational guidance being provided to the user.

9. The system of claim 8, wherein the one or more sensors within the mobile navigation device include:
  a motion sensor integrated into the mobile navigation device and generating the motion data to be representative of movement of the mobile navigation device as the user carries the mobile navigation device; and
  a geolocation sensor generating the geolocation data to be representative of a geolocation of the mobile navigation device as the user carries the mobile navigation device.

10. The system of claim 8, wherein the feature of the navigational guidance that is suspended in response to the detecting that the user is making the stop that was not planned for includes at least one of:
  a voice guidance feature;
  a textual guidance feature;
  a graphical guidance feature;
  a haptic guidance feature; and
  a non-verbal audible guidance feature.

11. The system of claim 8, wherein the processor is further configured to execute the instructions to:

determine, subsequent to the suspending of the feature of the navigational guidance, that the user switches back from the second to the first transportation mode; and resume, in response to the determining that the user switches back from the second to the first transportation mode, the feature of the navigational guidance.

12. The system of claim 8, wherein:

the first transportation mode is an automotive transportation mode; and the second transportation mode is a non-vehicular transportation mode.

13. The system of claim 8, wherein the processor is further configured to execute the instructions to:

detect, based on the geolocation data and in response to the determining that the user is making the stop along the route that was not planned for, a geolocation of the mobile navigation device during the stop along the route that was not planned for;

identify location-customized information associated with the geolocation of the mobile navigation device during the stop along the route that was not planned for; and present the location-customized information to the user, the location-customized information presented by way of the mobile navigation device while the user employs the second transportation mode.

14. The system of claim 8, wherein the confidence threshold is configured to implement an error preference to err by failing to detect a true transportation mode switch rather than positively detecting a false transportation mode switch.

15. A non-transitory computer-readable medium storing instructions that, when executed, direct a processor of a computing device to:

determine a route from a starting location to a destination location, the route planned based on user input representative of a request by a user of a mobile navigation device implemented by a mobile computing device;

provide, to the user, navigational guidance along the route;

identify a first transportation mode being employed by the user to traverse the route;

receive, while the navigational guidance is being provided, sensor data that includes motion data and geolocation data and is generated by one or more sensors within the mobile navigation device;

determine, while the navigational guidance is being provided and based on the sensor data, that the user switches from the first transportation mode to a second transportation mode the determining that the user switches from the first to the second transportation mode including:

determining, based on the motion data, that the user has possibly switched from the first to the second transportation mode, determining, based on the geolocation data, a confidence metric representative of a confidence level that the user actually switched from the first to the second transportation mode, and determining that the confidence metric satisfies a confidence threshold;

detect, based on the determining that the user switches from the first to the second transportation mode, that the user is making a stop along the route that was not planned for in the determining of the route; and suspend, in response to the detecting that the user is making the stop that was not planned for, a feature of the navigational guidance being provided to the user.

16. The non-transitory computer-readable medium of claim 15, wherein the one or more sensors within the mobile navigation device include:

a motion sensor integrated into the mobile navigation device and generating the motion data to be representative of movement of the mobile navigation device as the user carries the mobile navigation device; and a geolocation sensor generating the geolocation data to be representative of a geolocation of the mobile navigation device as the user carries the mobile navigation device.

17. The non-transitory computer-readable medium of claim 15, wherein the feature of the navigational guidance that is suspended in response to the detecting that the user is making the stop that was not planned for includes at least one of:

a voice guidance feature;

a textual guidance feature;

a graphical guidance feature;

a haptic guidance feature; and a non-verbal audible guidance feature.

18. The non-transitory computer-readable medium of claim 15, wherein the instructions further direct the processor to:

determine, subsequent to the suspending of the feature of the navigational guidance, that the user switches back from the second to the first transportation mode; and resume, in response to the determining that the user switches back from the second to the first transportation mode, the feature of the navigational guidance.

19. The non-transitory computer-readable medium of claim 15, wherein the instructions further direct the processor to:

detect, based on the geolocation data and in response to the determining that the user is making the stop along the route that was not planned for, a geolocation of the mobile navigation device during the stop along the route that was not planned for;

identify location-customized information associated with the geolocation of the mobile navigation device during the stop along the route that was not planned for; and present the location-customized information to the user, the location-customized information presented by way of the mobile navigation device while the user employs the second transportation mode.

20. The non-transitory computer-readable medium of claim 15, wherein the confidence threshold is configured to implement an error preference to err by failing to detect a true transportation mode switch rather than positively detecting a false transportation mode switch.

* * * * *